(12) United States Patent
Malte et al.

(10) Patent No.: US 9,137,800 B2
(45) Date of Patent: Sep. 15, 2015

(54) METHOD FOR COMMUNICATING WITH A USER EQUIPMENT USING PLURALITY OF TRANSMIT ANTENNAS

(71) Applicant: Huawei Technologies Co., Ltd., Shenzhen (CN)

(72) Inventors: Schellmann Malte, Munich (DE); Schulz Egon, Munich (DE)

(73) Assignee: Huawei Technologies Co., LTD, Shenzhen (CN)

( * ) Notice: Subject to any disclaimer, the term of this patent is extended or adjusted under 35 U.S.C. 154(b) by 329 days.

(21) Appl. No.: 13/735,666

(22) Filed: Jan. 7, 2013

(65) Prior Publication Data

US 2013/0142148 A1 Jun. 6, 2013

Related U.S. Application Data

(63) Continuation of application No. PCT/CN2010/075015, filed on Jul. 6, 2010.

(51) Int. Cl.
*H04W 4/00* (2009.01)
*H04W 72/04* (2009.01)
*H04B 7/02* (2006.01)
*H04B 7/06* (2006.01)

(52) U.S. Cl.
CPC ........... *H04W 72/046* (2013.01); *H04B 7/0689* (2013.01); *H04B 7/024* (2013.01); *H04B 7/0617* (2013.01)

(58) Field of Classification Search
CPC ......... H04L 2012/5608; H04W 84/12; H04W 88/08; H04W 80/04; H04W 88/06; H04W 84/18; H04W 36/30; H04W 36/24; H04W 52/40; H04W 72/046; H04B 7/0617; H04B 7/024; H04B 7/0689

USPC ............. 370/310.2, 328, 332, 333, 334, 338, 370/349

See application file for complete search history.

(56) References Cited

U.S. PATENT DOCUMENTS 7,180,447 B1 * 2/2007 Jacomb-Hood ............... 342/374
7,327,797 B2 * 2/2008 Yu et al. ......................... 375/267
7,684,761 B2 * 3/2010 Hottinen .......................... 455/69

(Continued)

FOREIGN PATENT DOCUMENTS

| CN | 1845467 A | 10/2006 |
|---|---|---|
| CN | 101185271 A | 5/2008 |
| CN | 101729115 A | 6/2010 |

OTHER PUBLICATIONS

Extended European Search Report for Application No. 10854287.9, mailed May 8, 2013, 8 pages.

(Continued)

*Primary Examiner* — Brenda H Pham
(74) *Attorney, Agent, or Firm* — Slater & Matsil, L.L.P.

(57) ABSTRACT

The invention relates to a method for communicating with a user equipment using a plurality of transmit antennas being capable of generating transmission beams in a communication network. The method includes deciding whether to generate either a first transmission beam using a first beamforming approach or to generate a second transmission beam using a second beamforming approach in dependency on a network condition. Based upon a result of the deciding, the first transmission beam or the second transmission beam is transmitted towards the user equipment.

18 Claims, 8 Drawing Sheets

(56) References Cited

U.S. PATENT DOCUMENTS

| 8,155,229 | B2* | 4/2012 | Lee et al. ............. 375/267 |
| 8,218,422 | B2* | 7/2012 | Venturino et al. ......... 370/208 |
| 8,228,810 | B2* | 7/2012 | Zhou et al. ............. 370/252 |
| 2007/0099578 | A1* | 5/2007 | Adeney et al. ............ 455/69 |
| 2008/0260051 | A1* | 10/2008 | Boccardi et al. .......... 375/259 |
| 2009/0093265 | A1* | 4/2009 | Kimura et al. ........... 455/500 |
| 2009/0323530 | A1* | 12/2009 | Trigui et al. ............ 370/235 |
| 2010/0104038 | A1* | 4/2010 | Stager et al. ............ 375/267 |
| 2012/0020334 | A1 | 1/2012 | Yu et al. |

OTHER PUBLICATIONS

Hitachi Ltd., "A UE Initiated Frequency Partitioning Based CoMP Scheme for Downlink Cellular Communications," 3GPP TSG-RAN WG1 #60, R101-101538, Feb. 22-26, 2010, San Francisco, USA, 8 pages.

Kusashima, Naoki, et et al., "Fractional Base Station Cooperation Cellular Network," 2009 IEEE, 5 pages.

Motorola, "Coordinated Multi-Point Transmission—Exploring Possible System Operations and UE Support," TSG-RAN WG1 #55, RI-084407, Nov. 10-14, 2008, Prague, Czech Republic, 4 pages.

Potevio, "Considerations on CoMP Switching and Scenarios," 3GPP TSG-RAN WG1 Meeting #59, RI-094806, Nov. 9-13, 2009, Jeju, Korea, 2 pages.

Qualcomm Europe, "Coordinated Multi-Point Downlink Transmission in LTD-Advanced," 3GPP TSG-RAN WG1 #55, R1-084400, Nov. 10-15, 2008, Prague, CzechRepublic, 6 pages.

Boccardi, F., et al., "A Near-Optimum Technique Using Linear Precoding for the MIMO Broadcast Channel," ICASSP, IEEE Xplore, Oct. 10, 2008, 4 pages.

Gomadam, K., et al., "Approaching the Capacity of Wireless Networks through Distributed Interference Alignment," Global Telecommunications Conference, University of California, Irvine, CA, Conference date of Nov. 30, 2008-Dec. 4, 2008, 10 pages.

Winters, Jack H., "Optimum Combining in Digital Mobile Radio with Cochannel Interference," IEEE Transactions on Vehicular Technology, vol. VT-33, No. 3, Aug. 4, 1984, 12 pages.

International Search Report and Written Opinion of International Application No. PCT/CN2010/075015, Applicant: Huawei Technologies Co., Ltd., et al., dated Apr. 7, 2011, 13 pages.

* cited by examiner $t = t_3$

US 9,137,800 B2

METHOD FOR COMMUNICATING WITH A USER EQUIPMENT USING PLURALITY OF TRANSMIT ANTENNAS

The application is a continuation of International Application No. PCT/CN2010/075015, filed on Jul. 6, 2010, which is hereby incorporated by reference in its entirety.

TECHNICAL FIELD

The present invention relates to communications over communication networks using beamforming, and in particular to radio access in cellular communication systems supporting multiple input multiple output (MIMO) technology.

BACKGROUND

For future cellular systems, the frequency will be reused in each cell, resulting in inter-cell interference especially for the users residing near the cell edge. There exist several solutions to mitigate this interference based on MIMO beamforming techniques. The gain those solutions are able to deliver may depend on the application scenario as well as on current channel and signal conditions. However, applying the solutions for interference mitigation globally in all the cells imposes a severe increase of the system's complexity. Promising candidates aiming at interference mitigation are cooperative multipoint (CoMP) and interference alignment (IA).

For CoMP, the base stations in a cluster of adjacent cells cooperate and serve the users within the cluster based on joint beamforming techniques. In particular, the antennas at the single base stations are gathered to form a large antenna array. Then, based on the knowledge of the user channels seen from this array, beamforming vectors are calculated that do not cause any interference at the unintended receiving user terminals. While interference is forced to zero by the CoMP technique, it can also deliver a macro-diversity gain through transmitting the useful signal intended for receiving terminal from additional antennas that are distributed in space. According to some implementations, the CoMP approach may require synchronized base stations, synchronized data transmissions from the antennas at different base stations and full knowledge of channels to all users to be served must be available at transmit side. Furthermore, high backhaul requirements may be present, as transmit data may be available at all antenna heads.

In IA, users are still served solely by their assigned base station. A beamforming is used that aligns the direction of the interference from a cell cluster seen at a user terminal, so that the terminal can use its multi-antennas to suppress the interference. The IA technique, however, may require full knowledge of useful and interference channels at the base stations of the cluster. Thus a cooperation between the single sites may not be taken into account, and hence macro-diversity gains may not be realized. According to some implementations, the IA approach may require a knowledge of useful and interference channels to the user terminals to be served; i.e. the channels from all base stations of the cluster seen at the side of the terminal. However, compared to CoMP, the requirements of backhaul and synchronization are rather weak.

SUMMARY OF THE INVENTION

A goal to be achieved by the present invention is to provide a beamforming transmission approach that reduces interference.

The invention based on the finding that an efficient beamforming approach with reduced interference may be provided by simultaneously supporting multiple techniques for interference management in cellular communication systems. By way of example, a mechanism to switch between those techniques in dependence of current signal conditions, i.e. network conditions such as signal-to-noise ratio, may be implemented. The mechanism may switch between different beamforming approaches such as CoMP (Cooperative Multipoint), IA (Interference Alignment) and, e.g., uncoordinated transmission based on adequately defined switching criterion. In this regard, the CoMP may offer a higher performance gain due to an increased number of degrees of freedom, which is made available by forming the large antenna array. Thus, the larger degrees of freedom may enable CoMP to achieve a higher multiplexing gain as well as a macro-diversity gain. As IA uses some of the degrees of freedom from the MIMO system for interference suppression, the number of spatially multiplexed streams that can be supported may be reduced.

According to a first aspect, the invention relates to a method for communicating with a user equipment using a plurality of transmit antennas being capable of generating transmission beams in a communication network. The method comprises deciding whether to generate either a first transmission beam using a first beamforming approach or to generate a second transmission beam using a second beamforming approach in dependency on a network condition, and transmitting the first transmission beam or the second transmission beam towards the user equipment. The user equipment may be a mobile terminal towards which a communication message may be transmitted using either the first transmission beam or the second transmission beam.

According to a first implementation form of the first aspect, the method comprises generating the first transmission beam using the first beamforming approach upon the basis of a plurality of transmit antennas. According to a second implementation form of the first aspect, the method comprises generating the second transmission beam using the second beamforming approach upon the basis of a plurality of transmit antennas. The respective transmission beam may be generated by steering the transmit antennas according to the respective beamforming approach, respectively.

According to a third implementation form of the first aspect, the first beamforming approach or the second beamforming approach is a cooperative multipoint approach. The cooperative multipoint approach enables the highest possible beamforming gains that translate to a high system throughput, but it also comes at considerable implementation costs. Reference for CoMP approach: F. Boccardi and H. Huang, "A near-optimum technique using linear precoding for the MIMO broadcast channel," Acoustics, Speech and Signal Processing, 2007. ICASSP 2007. IEEE International Conference on, vol. 3, pp. III-17-III-20, April 2007.

According to a fourth implementation form of the first aspect, the first beamforming approach or the second beamforming approach is an interference alignment approach. The beamforming gains based on interference alignment are not as large as those from cooperative multipoint approach; however, the required implementation costs are also significantly lower. Reference for interference alignment approach: K. Gomadam, V. R. Cadambe, S. A. Jafar, "Approaching the Capacity of Wireless Networks through Distributed Interference Alignment", ArXiv preprint, 2008.

According to a fifth implementation form of the first aspect, the first beamforming approach or the second beamforming approach is an Eigenbeamforming approach. The features of the third, fourth and fifth implementation forms of the first aspect can also be combined with the additional features of any of the first or second implementation form of that aspect. Further, particular beam forming approaches mentioned with respect to the third, fourth and fifth implementation forms of the first aspect can be combined in any form ensuring that always the first and the second beamforming approach are different from each other.

According to a sixth implementation form of the first aspect, the first beamforming approach or the second beamforming approach are based upon using a plurality of transmit antennas of the same network transmission node.

Alternatively, according to a seventh implementation form of the first aspect, the first beamforming approach or the second beamforming approach are based upon using a plurality of transmit antennas of a plurality of network transmission nodes, in particular base stations. In this regard, the transmit antennas of the plurality of network transmission nodes may be steered such that the respective transmission beam may be generated. The features of the sixth and seventh implementation forms of the first aspect can respectively also be combined with the additional features of any of the first to fifth implementation form of that aspect.

According to an eight implementation form of the first aspect, the network condition is a local position of the user equipment in the communication network in a communication cell of the communication network. For this local position, for example, conditions affecting the quality of the transmission link (like shadowing, mean path loss) can be derived from corresponding environmental maps if available.

According to a ninth implementation form of the first aspect, the network condition is a communication cell in which the user equipment is arranged. A criterion for the selection of the beamforming approach could for example be, whether or not the respective communication cell is for example the communication cell or belongs for example to a set of communication cells where the user equipment received the strongest signals from.

According to a tenth implementation form of the first aspect, the network condition is a channel characteristic of a communication channel between a base station or a set of base stations and the user equipment.

According to an eleventh implementation form of the first aspect, the network condition may be the bit error rate (BER). By defining a suitable threshold for the BER to fulfil minimum requirements, the system may switch to a beamforming technique providing higher throughput gain if the BER falls below that threshold.

According to a twelfth implementation form of the first aspect, the network condition may be a block error rate (BLER). By defining a suitable threshold for the BER to fulfil minimum requirements, the system may switch to a beamforming technique providing higher throughput gain if the BLER falls below that threshold.

According to a thirteenth implementation form of the first aspect, the network condition may be the CTI value (carrier to interference value). In any of the latter three implementation forms, a selection criterion for the transmission beam could for example be whether the respective evaluation indicator is higher, equals, or is lower than a predetermined threshold value, or is within or outside a predetermined area.

According to a fourteenth implementation form of the first aspect, the network condition may be a service dependent requirement, e.g., a throughput requirement, a delay requirement, or a handover requirement. Generally, the service dependent requirement aims at sustaining a connection to a network node such as a base station as long as technically possible.

According to a fifteenth implementation form of the first aspect, the network condition may be a composite network condition comprising a channel quality indicator and a service dependent requirement, e.g., the above-mentioned service dependent requirement. The channel quality indicator may be a bit error rate or a block error rate or a CTI value.

According to a sixteenth implementation form of the first aspect, the network condition is a composite network condition may comprise a channel quality indicator and a service dependent requirement, wherein the respective transmission beam is generated in dependency on the service dependent requirement only. In other words, the service dependent requirement may have a higher priority than the channel quality indicator and thus overrule the channel quality indicator. The service dependent requirement may be the above-mentioned service dependent requirement. The channel quality indicator may be a bit error rate or a block error rate or a CTI value.

According to a seventeenth implementation form of the first aspect, the method comprises determining the network condition by, e.g., measuring the network condition or receiving the network condition from a remote network transmission node or the user equipment.

According to a eighteenth implementation form of the first aspect, the method further comprises determining network-related costs which are associated with generating the first transmission beam and the second transmission beam, and deciding whether to generate the first transmission beam or the second transmission beam in a further dependency on the network-related costs. The network related costs may, e.g., indicate an effort or the complexity which is necessary to generate the respective transmission beam.

The features of the implementation forms one to five and seven to eighteen may be combined with each other to obtain further implementation forms of the first aspect. Correspondingly, the features of the implementation forms one to six and eight to eighteen may be combined with each other to obtain further implementation forms of the first aspect.

According to a second aspect, the invention relates to a network transmission node for communicating with a user equipment using transmit antennas being capable of generating transmission beams in a communication network. The network transmission node comprises a plurality of transmit antennas, and a controller for deciding whether to generate either a first transmission beam using a first beamforming approach or to generate a second transmission beam using a second beamforming approach in dependency on a network condition, wherein the controller is further configured to steer the plurality of transmit antennas to transmit either the first transmission beam or the second transmission beam towards the user equipment.

According to a first implementation form of the second aspect, the controller is configured to steer at least one transmit antenna of a further network transmission node to transmit either the first transmission beam or the second transmission beam towards the user equipment.

According to a second implementation form of the second aspect, the network transmission node is configured to perform the inventive method for communicating with a user equipment using a plurality of transmit antennas.

The implementation forms of the second aspect may be combined with each other to obtain further implementation forms of the second aspect.

BRIEF DESCRIPTION OF THE DRAWINGS

Further embodiments of the invention will be described with respect to the following figures, in which.

DETAILED DESCRIPTION OF ILLUSTRATIVE EMBODIMENTS

Figure 1:
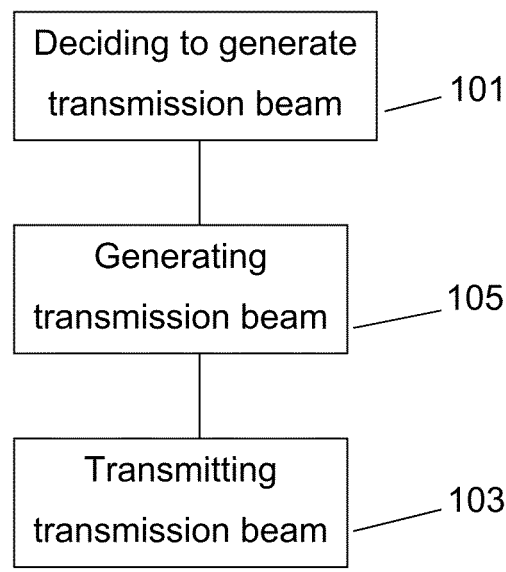
FIG. 1 shows a diagram of a method for communicating with a user equipment.

FIG. 1 shows a diagram of a method for communicating with a user equipment using a plurality of transmit antennas which are capable of generating transmission beams which may be transmitted towards the user equipment in a communication network. The method comprises deciding 101 whether to generate either a first transmission beam using a first beamforming approach or to generate a second transmission beam using a second beamforming approach in dependency on a network condition. The method further comprises transmitting 103 the first transmission beam or the second transmission beam towards the user equipment. In order to transmit the first or second transmission beam, the method may comprise generating 105 the transmission beam according to either the first or the second or to any other beamforming approach using a plurality of transmit antennas. The transmit antennas may be arranged within the same transmission network node such as a base station or within different transmission network nodes, e.g., base stations.

Figure 2:
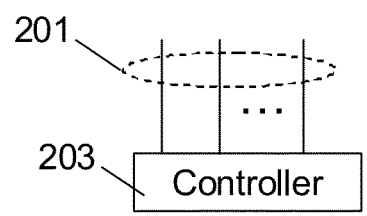
FIG. 2 shows a block diagram of a network transmission node.

FIG. 2 shows a block diagram of a network transmission node for communicating with a user equipment using a plurality of transmit antennas being capable of generating transmission beams in a communication network. The network transmission node comprises a plurality of transmit antennas 201, and a controller 203 for deciding whether to generate either a first transmission beam using a first beamforming approach or to generate a second transmission beam using a second beamforming approach in dependency on a network condition. The controller 203 may further be configured to steer the plurality of transmit antennas to transmit either the first transmission beam or the second transmission beam towards the user equipment.

Figure 3:
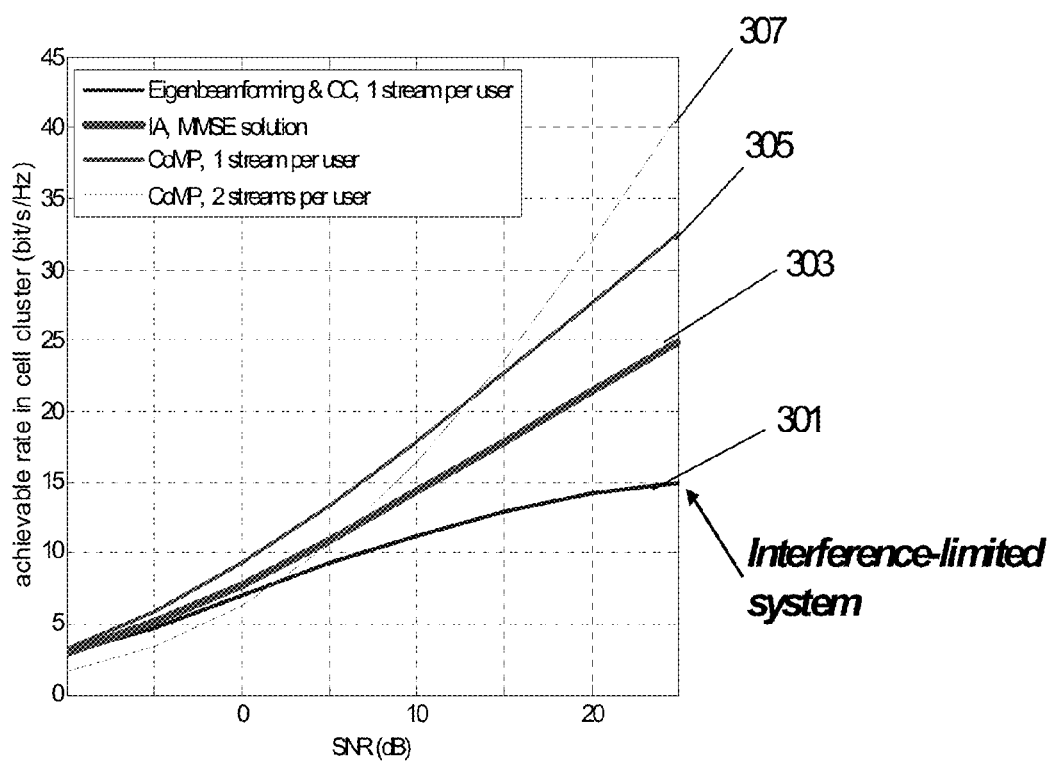
FIG. 3 demonstrates a downlink performance with different beamforming approaches.

FIG. 3 shows a downlink performance vs. SNR for a 3-cell cluster, wherein the base stations forming embodiments of network transmission nodes and user terminals forming embodiments of user equipment are respectively equipped with 2 antennas. By way of example, FIG. 3 shows the performance of various MIMO downlink transmission schemes that support measures for interference suppression. By way of example, a cluster consisting of 3 adjacent cells is considered, where a single user terminal (UT) which forms an embodiment of a user equipment is placed in each of these cells. The UTs are evenly distributed in the whole service area of the cell cluster. The interference from surrounding cells may be modeled by Gaussian noise, resulting in the specified SNR levels. BSs and UTs are equipped with 2 antennas each. The considered transmission schemes are:

Eigenbeamforming & OC, 301: Each base station (BS) knows the channel to the UT in its cell and serves it on its dominant Eigenbeam. The multi-antenna UT may know not only the channel to its assigned BS, but also all interfering channels from the BSs in the cluster. By using a linear equalizer based on the optimum combining (OC) technique, the interference is suppressed and post-equalization SINR may be maximized.

IA, MMSE, 303: Interference alignment solution based on the full knowledge of all channels between UTs and BSs of the cluster at the transmitter's side. To ensure good performance also in low to moderate SNR range, MMSE optimization technique may be used to calculate the IA solution.

CoMP, 1 stream, 305: Cooperative multipoint technique according to which each UT may be served with one spatial stream (high macro-diversity gain).

CoMP, 2 streams, 307: As above, but each UT is served with two spatial streams simultaneously (high multiplexing gain).

As shown in FIG. 3, the OC based technique may suppress some of the interference generated by the cluster, and hence its performance becomes interference-limited. It may, however, be observed that a substantial gain compared to the interference-limited system based on OC can be realized already with IA. The CoMP technique delivers an additional gain due to macro-diversity (1 stream) and multiplexing (2 streams). However, the costs of high requirements on backhaul and synchronization to enable simultaneous transmission of signals from the antennas of all BSs of the cluster may be increased. The CoMP with 2 streams per user may be beneficial not until SNR becomes relatively high, roughly 15 dB.

Figure 4:
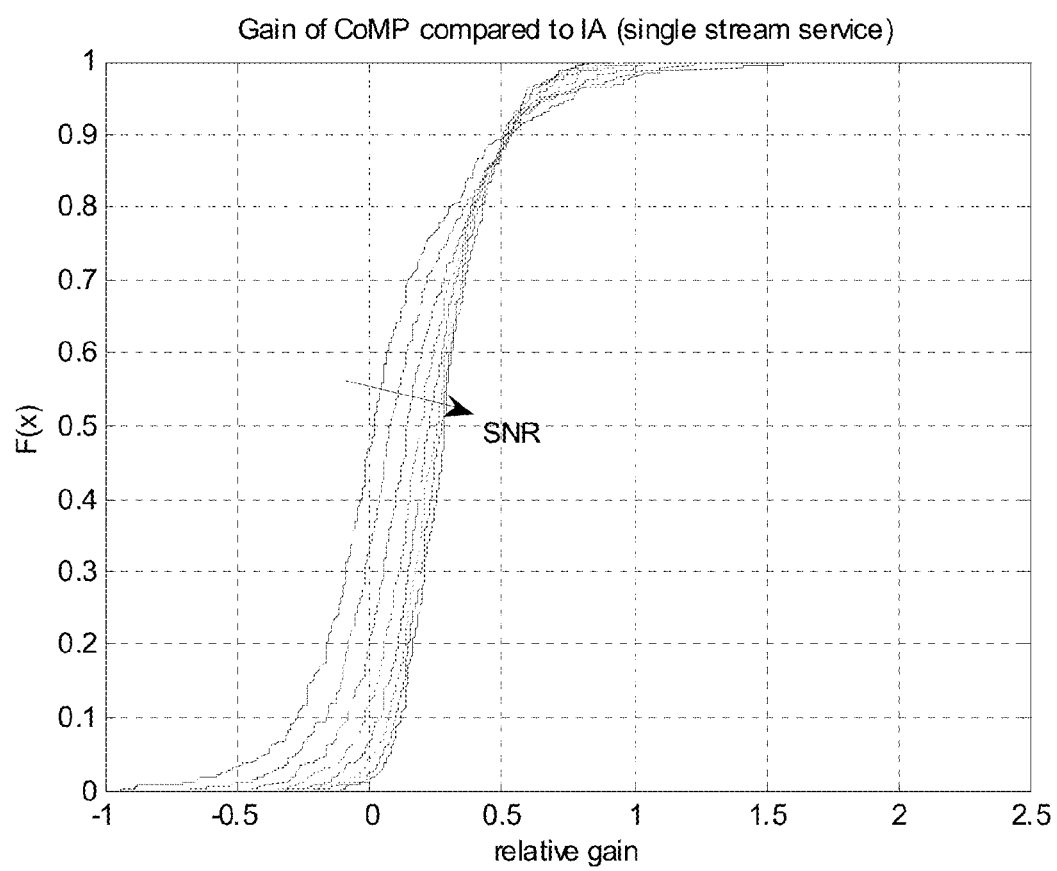
FIG. 4 shows relative gains achievable with different beamforming approaches.

FIG. 4 shows CDFs representing the relative gain of CoMP (single stream) compared to the performance of the IA approach. The CDFs presented above show the relative gain of CoMP technique supporting a single stream per user compared to the IA performance for increasing SNR. Following observations can be made: the additional gains from CoMP compared to IA are less than 30% in most of the cases for the considered SNR range, e.g., between −10 and 30 dB. Furthermore, the gain may be larger than 50% in about 10% of all cases. These observations motivate the approach of an access mode switching to find the optimum balance between a high system performance and moderate requirements on the system complexity.

Figure 5:
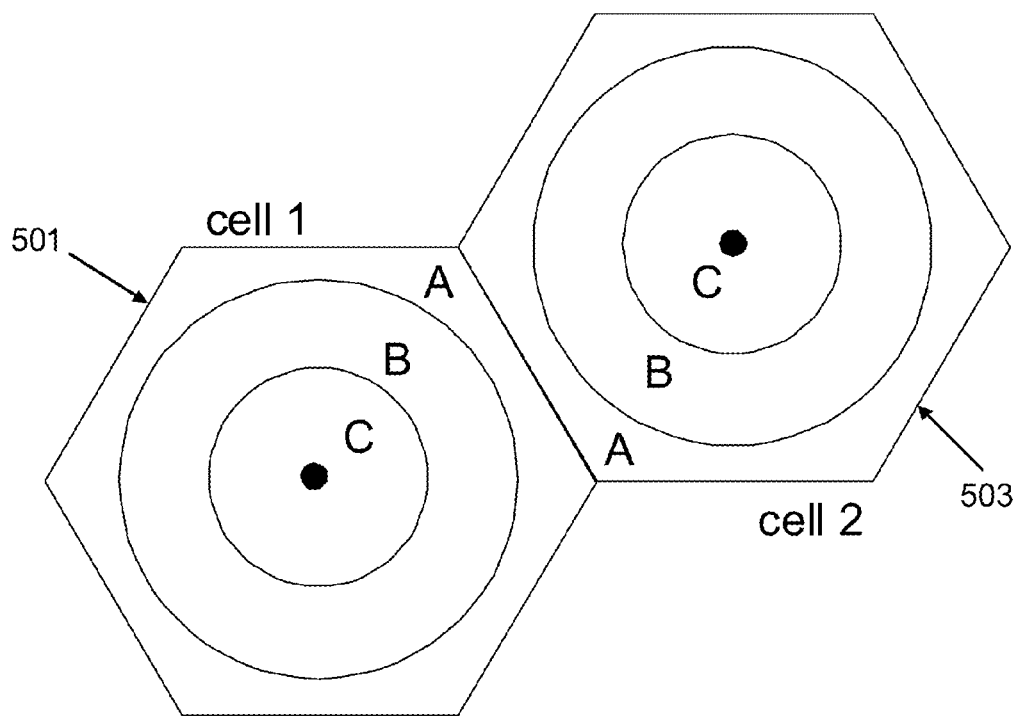
FIG. 5 shows a segregation of a cell service area.

FIG. 5 shows an embodiment of a segregation of a cell service area into divisions, i.e. regions, covered by access nodes. By way of example, FIG. 5 shows a first cell 501 and a second cell 503. In each cell, the adaptive access mode switching technique defines regions where a specific interference management technique is used, resulting into a virtual segregation of the cell service area. FIG. 5 shows, by way of example, an application example where the access mode is switched between three options: Region A—CoMP, Region B—IA, Region C—conventional techniques like beamforming and OC. As each cell 501, 503 takes the decision on the access mode to serve its users autonomously, these regions may vary independently over time, which is illustrated in FIG. 6.

Figure 6A:
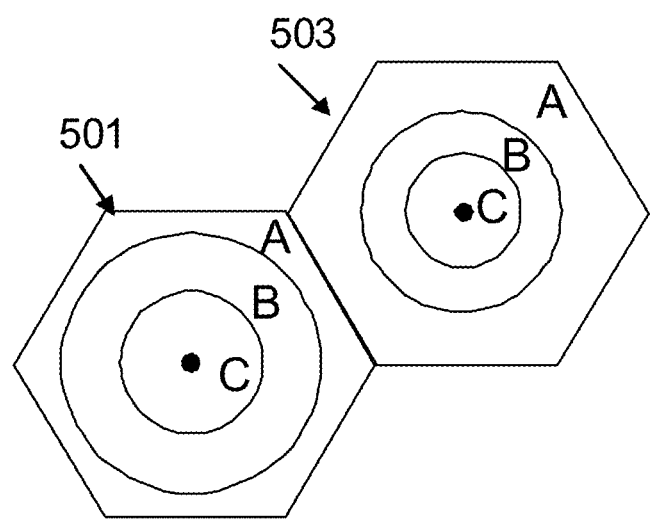
FIG. 6a-6c show dynamic behavior of a service area segregation.
Figure 6B:
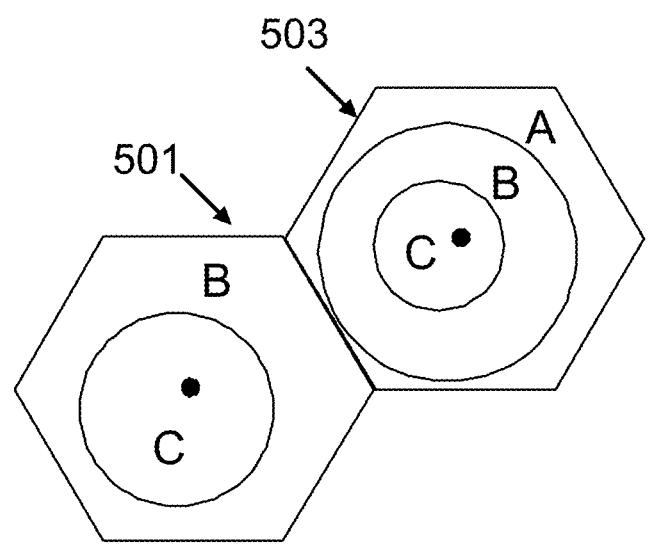
Figure 6C:
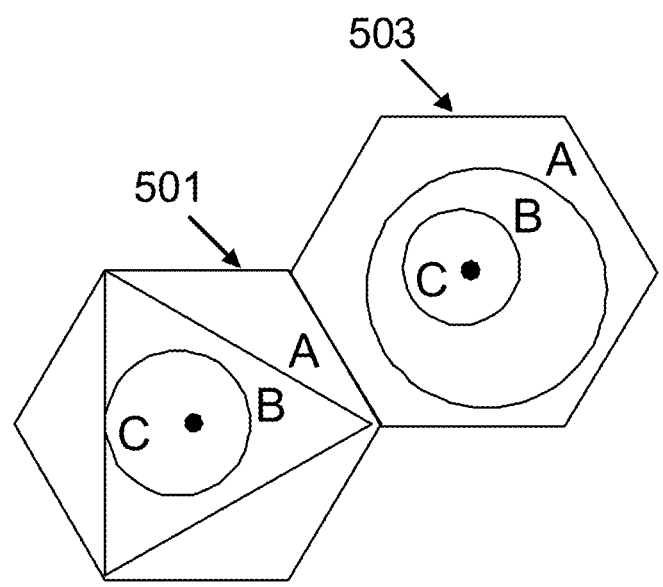

FIG. 6 shows a dynamic behavior of the service area segregation as depicted in FIG. 5 through an adaptive access mode switching. As shown in FIG. 6, the shape of the regions A, B and C may vary over time and may be different at different time instants $t_1$, $t_2$ and $t_3$. Thus, the decision whether to generate the respective transmission beam according to the respective beamforming approach may iteratively be made or at least verified or reconsidered whenever the signal conditions change.

Figure 7:
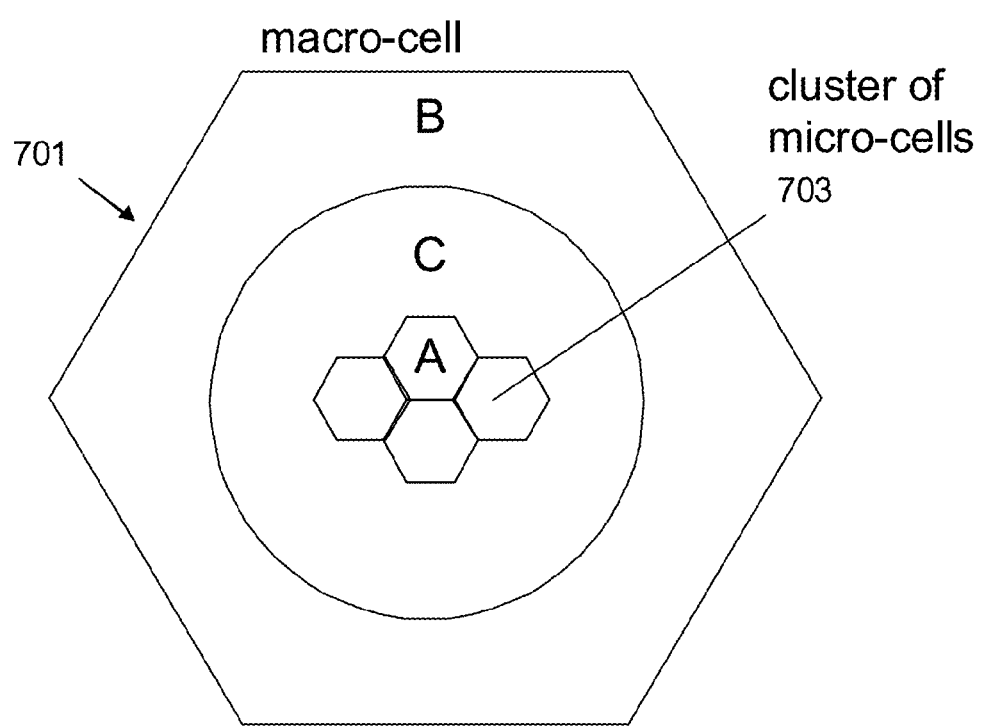
FIG. 7 shows an application of a dynamic access mode switching concept in a multi-tier network.

FIG. 7 shows an embodiment of an application of a dynamic access mode switching concept in a multi-tier network with a microcell 701 comprising a cluster of microcells 703 forming a first region A. The first region A is surrounded by a second region C which itself is surrounded by a third region B, by way of example.

According to some embodiments, cell edge users may benefit the most from interference mitigation, whereas users in the cell center benefit only marginally. Furthermore, it may be observed that the most severe interference is generated from adjacent base stations, wherein residual interference shows noise-like effect.

According to some embodiments, a large performance gain compared to conventional approaches with interference-limited behavior may be realized with IA, while CoMP may yield an additional gain of 10-150%. Thus, a selection of the most suitable transmission technique may be made dependent on the actual channel and signal conditions. Thus, e.g., a base station may dynamically select the appropriate transmission technique to serve the users, resulting in a segregation of the cell service area into divisions governed by access modes as shown, e.g., in FIG. 5.

According to some embodiments, multiple techniques for interference management and a process to autonomously switch between those techniques based on appropriately defined switching criteria may be supported. The switching process may enable the system to adapt its operational mode to the application scenario as well as to current channel conditions, providing the system with self-organization capabilities. Decisions are driven by the base stations of a cluster in the multi-cell network based on threshold values for various quality measures like BER, C/I, system throughput etc. Thus, the switching concept according to which different beamforming approaches may be selected, may, according to some embodiments, allow using the complexity-demanding interference management technique only when it is really needed and thus significantly relaxes demands on system complexity as well as on backhaul capacity.

According to some embodiments, the backhaul load may increase gradually, as a demanding interference management technique like CoMP or IA may be used only if significant performance gain can be expected compared to other techniques supported by the system. With the proposed solution, the CoMP technique may be applied in few cases only, relaxing the synchronization requirements as well as the demands on the overall computational complexity. Thus, the base stations may operate independently and autonomously most of the time, which may improve the system reliability.

According to some embodiments, the decision on the technique used to serve each user, i.e. user equipment, may be done by the serving base station. This decision may be signaled to the user, so that he can configure his receiver accordingly.

What is claimed is:

1. A method for communicating with a user equipment using a plurality of transmit antennas that are capable of generating transmission beams in a communication network, the method comprising:
   deciding whether to generate either a first transmission beam using a first beamforming approach or to generate a second transmission beam using a second beamforming approach in dependency on a network condition; and
   based on a result of the deciding, transmitting either the first transmission beam or the second transmission beam towards the user equipment;
   wherein the first beamforming approach is a cooperate multipoint approach or an Eigen beamforming approach; and
   wherein the second beamforming approach is an interference alignment approach.

2. The method according to claim 1, further comprising generating either the first transmission beam using the first beamforming approach or the second transmission beam using the second beamforming approach using a plurality of transmit antennas.

3. The method according to claim 1, wherein the first beamforming approach or the second beamforming approach are based upon using a plurality of transmit antennas of the same network transmission node.

4. The method according to claim 1, wherein the first beamforming approach or the second beamforming approach are based on using a plurality of transmit antennas of a plurality of network transmission nodes.

5. The method according to claim 4, wherein the network transmission nodes comprise base stations.

6. The method according to claim 1, wherein the network condition is a position of the user equipment in the communication network in a communication cell of the communication network, or a sector of a communication cell in which the user equipment is arranged, or a channel characteristic of a communication channel towards the user equipment, or a bit error rate, or a block error rate, or a carrier to interference value, or a service dependent requirement.

7. The method according to claim 1, further comprising determining the network condition.

8. The method according to claim 1, wherein the network condition is a composite network condition comprising a channel quality indicator and a service dependent requirement.

9. The method according to claim 8, wherein the respective transmission beam is generated in dependency on the service dependent requirement only.

10. The method according to claim 1, further comprising determining network-related costs associated with generating the first transmission beam and the second transmission beam and wherein deciding whether to generate the first transmission beam or the second transmission beam is also dependent on the network-related costs.

11. A network transmission node for communicating with a user equipment using transmit antennas that are capable of generating transmission beams in a communication network, the network transmission node comprising:
    a plurality of transmit antennas;
    a controller configured to decide whether to generate either a first transmission beam using a first beamforming approach or to generate a second transmission beam using a second beamforming approach in dependency on a network condition, wherein the controller is further configured to steer the plurality of transmit antennas to transmit either the first transmission beam or the second transmission beam towards the user equipment;
    wherein the first beamforming approach is a cooperate multipoint approach or an Eigen beamforming approach; and
    wherein the second beamforming approach is an interference alignment approach.

12. The network transmission node of claim 11, wherein the controller is configured to steer at least one transmit antenna of a further network transmission node to transmit to transmit either the first transmission beam or the second transmission beam towards the user equipment.

13. A network transmission node comprising a processor and a computer-readable storage medium storing a program to be executed by the processor, the program configured to control a plurality of transmit antennas that are capable of generating transmission beams in a communication network, wherein the program includes instructions for:

deciding whether to generate either a first transmission beam using a first beamforming approach or to generate a second transmission beam using a second beamforming approach in dependency on a network condition; and based on a result of the deciding, transmitting either the first transmission beam or the second transmission beam towards the user equipment;

wherein the first beamforming approach is a cooperate multipoint approach or an Eigen beamforming approach; and wherein the second beamforming approach is an interference alignment approach.

14. The network transmission node according to claim 13, wherein the network transmission node further comprises the plurality of transmit antennas.

15. The network transmission node according to claim 13, wherein the network condition is a position of the user equipment in the communication network in a communication cell of the communication network, or a sector of a communication cell in which the user equipment is arranged, or a channel characteristic of a communication channel towards the user equipment, or a bit error rate, or a block error rate, or a carrier to interference value, or a service dependent requirement.

16. The network transmission node according to claim 14, wherein the network condition is a composite network condition comprising a channel quality indicator and a service dependent requirement.

17. The network transmission node according to claim 16, wherein the respective transmission beam is generated in dependency on the service dependent requirement only.

18. The network transmission node according to claim 14, wherein the program further includes instructions for determining network-related costs associated with generating the first transmission beam and the second transmission beam and wherein deciding whether to generate the first transmission beam or the second transmission beam is also dependent on the network-related costs.

* * * * *